US00RE34226E

United States Patent [19]

Morishita

[11] E Patent Number: Re. 34,226

[45] Reissued Date of Patent: Apr. 20, 1993

[54] CYLINDER HEAD COOLING FOR MULTIPLE VALVE ENGINE

[75] Inventor: Isao Morishita, Iwata, Japan

[73] Assignee: Yamaha Hatsudoki Kabushiki Kaisha, Iwata, Japan

[21] Appl. No.: 713,405

[22] Filed: Jun. 10, 1991

Related U.S. Patent Documents

Reissue of:

[64] Patent No.: 4,972,807
Issued: Nov. 27, 1990
Appl. No.: 357,473
Filed: May 26, 1989

[30] Foreign Application Priority Data

May 30, 1988 [JP] Japan ..... 63-134053

[51] Int. Cl.[5] ..... F02F 1/36

[52] U.S. Cl. ..... 123/41.82 R; 123/41.76

[58] Field of Search ..... 123/41.72, 41.74, 41.76, 123/41.77, 41.82 R, 193 H, 310, 41.41

[56] References Cited

U.S. PATENT DOCUMENTS

| | | | |
|---|---|---|---|
| 2,710,602 | 6/1955 | Maybach | 123/41.76 |
| 3,491,731 | 1/1970 | Dinger et al. | 123/41.77 |
| 4,635,591 | 1/1987 | Hledin | 123/310 |
| 4,714,058 | 12/1987 | Oda et al. | 123/41.82 R |

*Primary Examiner*—Noah P. Kamen
*Attorney, Agent, or Firm*—Ernest Beutler

[57] ABSTRACT

A cooling jacket arrangement for the cylinder head of a multiple valve internal combustion engine embodying a single camshaft for operating all of the valves. The cooling jacket is supplied with coolant in proximity to portions of the cylinder head that support the exhaust valves and coolant is discharged from outlets formed in portions of the cylinder head that journal the intake valves so as to insure uniform cylinder head temperature. The invention is disclosed in combination with either single or multiple spark plug arrangements and in each embodiment at least a portion of the spark plug is also surrounded by the cooling jacket.

35 Claims, 8 Drawing Sheets

CYLINDER HEAD COOLING FOR MULTIPLE VALVE ENGINE

Matter enclosed in heavy brackets [ ] appears in the original patent but forms no part of this reissue specification; matter printed in italics indicates the additions made by reissue.

BACKGROUND OF THE INVENTION

This invention relates to a cylinder head cooling arrangement for multiple valve engines and more particularly to an improved arrangement for cooling the combustion chamber of a multiple valve, single overhead camshaft internal combustion engine.

As is well known, there is a trend in internal combustion engines, particularly those employed for powering motor vehicles, to increase the performance of the engine through the use of multiple valves. Although multiple valve engines have the ability to significantly increase the performance of the engine for a given displacement, there are numerous problems to be solved in connection with the use of multiple valve engines. For example, when plural intake and exhaust valves are employed in an overhead valve engine, the area of the engine which is available to provide cooling for the combustion chamber, particularly on the cylinder head side, is significantly diminished. It is, of course, extremely important to control the cooling of the cylinder head so as to prevent unduly high temperatures which can give rise to numerous and well known defects. Furthermore, in addition to the problem of providing adequate cooling volume, it is also desirable to insure an appropriate coolant flow through the cylinder head so as to insure that cylinder head temperatures will be more uniform, particularly across the combustion chamber, so as to avoid hot spots and the disadvantages attendant thereto.

It is, therefore, a principal object of this invention to provide an improved cooling arrangement for the cylinder head of a multiple valve internal combustion engine.

It is further object of this invention to provide an improved cylinder head cooling arrangement for high performance multiple valve engines and an arrangement for insuring the proper coolant flow through the cylinder head cooling jacket.

In conjunction with the use of multiple valve engines, it is desirable if the number of camshafts required to operate the multiple valves can be reduced. This is, it is desirable to provide a relatively simple construction for operating all of the valves of a multiple valve engine. However, as the number of camshafts is reduced, the configuration of the cylinder head also becomes a problem. That is, the position of a single camshaft for operating all of the valves can give rise to certain difficulties in location of the spark plug. Basically, it is desirable to place the spark plug or spark plugs at substantially central locations in the combustion chambers so that the flame travel can be complete to all parts of the combustion chamber. However, with such spark plug and camshaft positioning, the problems of the provision of adequate cooling for the cylinder head become magnified.

It is, therefore, a still further object of this invention to provide an improved cylinder head arrangement for a multiple valve engine embodying a single overhead camshaft and having an effective cooling arrangement for the combustion chamber.

SUMMARY OF THE INVENTION

This invention is adapted to be embodied in a cylinder head for a liquid cooled internal combustion engine which cylinder head has a lower surface which surrounds a combustion chamber area. A plurality of intake valves have stem portions supported for reciprocation within the cylinder head and cooperate with intake passages formed in the cylinder head for sequentially delivering a charge to a combustion chamber formed at least in part by the cylinder head combustion chamber area. A plurality of exhaust valves have stem portions which are supported within the cylinder head and which cooperate with exhaust passages formed in the cylinder head for sequentially discharging a burnt charge from the combustion chamber. A cooling jacket is formed within the cylinder head contiguous to the combustion chamber area and extends at least partially around the portions of the cylinder head that journal some of the valve stems. Means are provided for admitting a liquid coolant to the cooling jacket in proximity to at least one of the cylinder head portions and means are provided for discharging liquid coolant from the cooling jacket in proximity to another of the cylinder head portions.

DETAILED DESCRIPTION OF THE PREFERRED EMBODIMENTS

Figure 1:
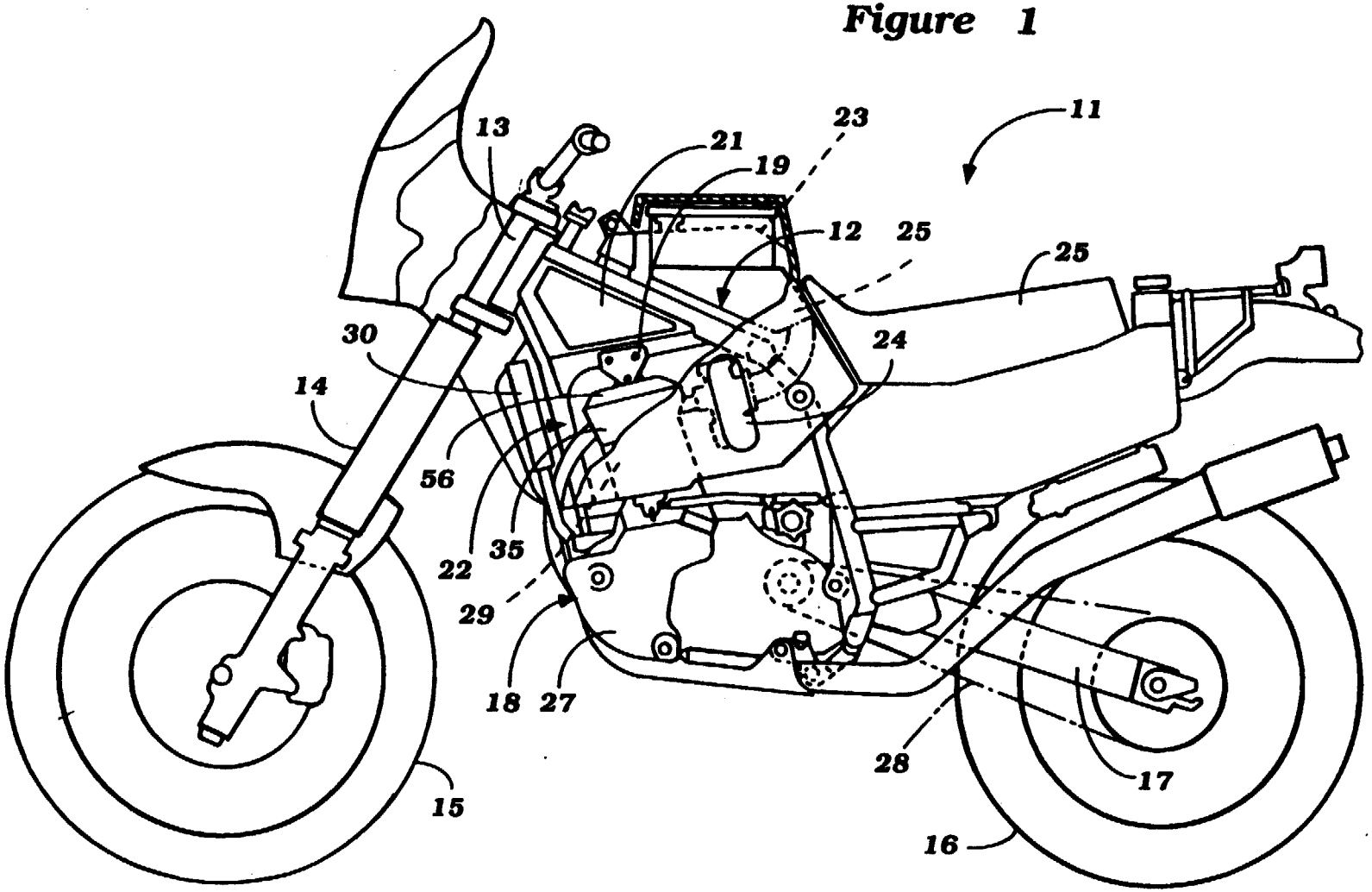
FIG. 1 is a side elevational view of a motorcycle powered by an internal combustion engine constructed in accordance with an embodiment of the invention, with a portion broken away.

Referring first to FIG. 1, a motorcycle powered by an internal combustion engine constructed in accordance with an embodiment of the invention is identified generally by the reference numeral 11. The motorcycle 11 is depicted as a typical environment in which an engine embodying the invention may be employed. The invention has particular utility in conjunction with internal combustion engines used to power vehicles. However, it will be readily apparent to those skilled in the art that the invention may be practiced in conjunction with other engine applications.

The motorcycle 11 is comprised of a frame assembly, indicated generally by the refernce numeral 1.2, and which is of the welded up type including a head pipe 13 that journals a front fork assembly 14 for steering movement and which supports a front wheel 15 in a known manner. In a similar manner, a rear wheel 16 is supported by the frame assembly 12 by means including a trailing arm suspension 17.

An internal combustion engine, indicated generally by the reference numeral 18 and shown in more details in FIGS. 2 through 5, is supported within the frame assembly 12 by means including an engine mount 19 that is affixed to a gusset plate 21 which is affixed to or forms a part of the frame assembly 12. The engine 18 is further supported in a suitable manner from a down tube 22 of the frame 12.

A fuel tank 23 is supported by the frame 12 above the engine 18 and supplies fuel to the engine in a known manner and specifically to carburetors 24 thereof. An air cleaner 25 supplies filtered air to the carburetors 24.

A seat 26 is supported on the rear of the frame assembly 12 behind the fuel tank 23 so as to accommodate a rider.

The engine 18, as is common with motorcycle practice, includes an integral crankcase, change speed transmission assembly 27 that drives the rear wheel 16 through a chain 28 in a known manner.

The engine 18 or at least portions of its are water cooled and for this purpose there is mounted a radiator 30 on the frame assembly 12 forwardly of the down tube 22. The construction of the motorcycle and its drive arrangement as thus far described may be considered to be conventional and, for the reason, further description of the motorcycle per se is not believed to be necessary to understand the construction and operation of the invention.

Referring now, therefore, primarily to FIGS. 2 through 5, the details of the engine 18 which form the part of the invention will now be described. In the drawings, only a single cylinder and specifically the combustion chamber and valve mechanism and cylinder head arrangement therefor have been illustrated in detail since the bottom end of the engine and its construction forms no part of the invention. Also, the application of the invention to multiple cylinder engines is believed to be well within the scope of those skilled in the art.

The engine 18 includes a cylinder block 29 which may be considered to be conventional and which has a cylinder bore 31 in which a piston 32 is supported for reciprocation. The cylinder bore 31 is provided by a cylinder liner 33 that is pressed or otherwise secured into the cylinder block assembly 29 and specifically a main casting 34 thereof. The piston 32 drives a crankshaft (not shown) in a known manner.

A cylinder head, indicated generally by the reference numeral 35, is affixed to the cylinder block 29 and is formed with a lower sealing surface which surrounds a combustion chamber recess 36 and that is adapted to be affixed in sealing relationship to the upper surface of the cylinder block 29 with an interposed gasket (not shown). The piston 32 and specifically its head and the cylinder bore 31 form with the cylinder head combustion chamber recess a chamber, the volume of which cyclically varies during the reciprocation of the piston 32 as is well known.

The engine 18 is provided with an induction system that comprises a first pair of intake valves 37 which are supported for reciprocation about parallel axes within valve guides pressed into the cylinder head 35. The axes of reciprocation of the first pair of intake valves 37 is disposed at an acute angle to a plane perpendicular to the plane of FIG. 2 and containing the axis of the cylinder bore 31. There is further provided a third intake valve 38 which also is supported for reciprocation within the cylinder head 35 by means of a pressed in intake valve guides and the intake valve 38 also reciprocates about an acute angle to the aforementioned plane. However, the axis of reciprocation of the intake valve 38 is at a lesser angle than the axes of reciprocation of the intake valves 37 to this plane, as described in U.S. Pat. No. 4,660,529, entitled "Four Cycle Engine", issued Apr. 28, 1987, and assigned to the assignee of this application.

Each of the intake valves 37 and 38 is urged toward its closed position by means of a coil spring assemblage 39 which bears against a respective pad 41 engaged with a surface of the cylinder head 35 and a retainer 42 that is affixed by means of a keeper assembly to the upper end of the stem of the respective intake valve. The valves 37 and 38 are opened in a manner which will be described.

The intake valves 37 and 38 control the flow of a fuel/air charge, formed by the carburetors 24, through an induction passage 43 that is formed in one side of the cylinder head assembly 35 and which terminates in valve seats 44 associated with the pair of intake valves 37 and a valve seat 45 associated with the remaining intake valve 38. The valve seats 44 and 45 may be suitably pressed within the cylinder head 35 in a known manner.

The induction passage 43 forms a single opening 46 in the intake side of the cylinder head 35 and a manifold section 47 is affixed to this intake side. The manifold section 47 includes two intake openings 48 which are separated by a dividing portion 49 that has a generally triangular shape configuration so as to merge the two intake openings 48 gradually into a single opening at the cylinder head opening 46. This permits the use of two carburetors 24 that are affixed to the manifold 47 for delivering adequate fuel/air charge to the three intake valves 37 and 38. Of course, other forms of charge forming systems including fuel injection systems may be utilized in conjunction with the invention.

The cylinder head 35 also supports a pair of exhaust valves 51 that are disposed generally on the opposite side of the aforenoted plane and which have stem portions that are reciprocally supported within the cylinder head 35 about parallel axes. The axis of reciprocation of the exhaust valves 51 is at an acute angle to the aforenoted plane and this angle is greater than the angle of reciprocation of the single intake valve 38 and lesser than the angle of reciprocation of the pair of exhaust valves 37, as noted in aforenoted U.S. Pat. No. 4,660,529. The exhaust valves 51 are urged to their closed position by means of coil compression springs 52 that are loaded in a manner similar to the springs 35 of the intake valves 37 and 38. These exhaust valves 51 are opened in a manner which will be described.

The exhaust valves 51 control the flow of exhaust gases through a pair of respective exhaust ports 53 that extend through the opposite side of the cylinder head from the intake port 41. The exhaust ports 53 originate at respective valve seats 54 that cooperate with each of the exhaust valves 51 in a known manner to control the flow of exhaust gases from the combustion chamber 37 into the exhaust ports 53. Is should be noted that the exhaust ports 53 diverge generally from the plane that is perpendicular to the aforenoted plane and which is parallel to the plane of FIG. 2 so that the engine can clear the single down pipe 22 of the frame assembly as clearly shown in FIG. 5. In this way, the engine can have adequate breathing capability and a relatively simple construction.

Figure 2:
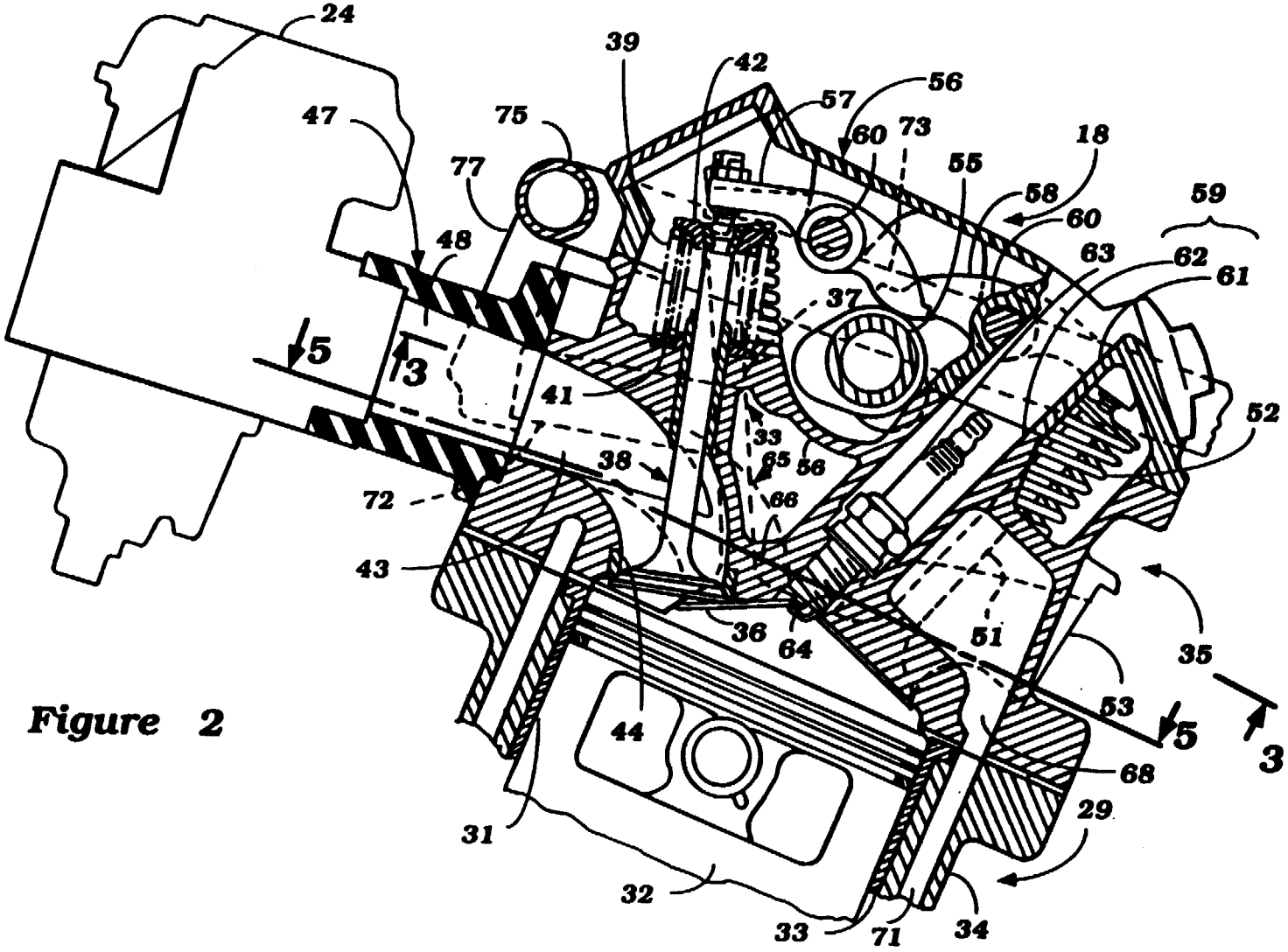
FIG. 2 is an enlarged cross-sectional view taken through one of the combustion chambers of the engine along a plane that passes generally through the axis of the cylinder bore.

Because of the orientation of the intake valves 37 and 38 and the exhaust valves 51, as seen in FIG. 2, the combustion chamber has a generally pent roof type of configuration. This is also as described more fully in aforenoted U.S. Pat. No. 4,660,529.

The intake valves 37 and 38 and exhaust valves 51 are all operated by means of a single overhead camshaft 55 that is journaled on the cylinder head assembly 35 for rotation about a camshaft axis that extends generally parallel to the aforementioned plane passing through the cylinder bore axis and perpendicular to the plane of FIG. 2. The camshaft axis is, however, offset toward the intake valves 37 and 38 and the intake valves 37 and 38 lie substantially on one side of a plane parallel to the aforenoted plane and containing the axis of rotation of the camshaft 55 while the exhaust valves 51 lie on the other side of this plane.

The manner of support for the camshaft 55 is described in my copending application entitled "Camshaft Arrangement For Multi-Valve Engine", Ser. No. 357,477, filed May 26, 1989 and assigned to the assignee of this application or my copending application entitled "Combustion Chamber And Valve Operating Mechanism For Multi-Valve Engine", Ser. No. 357,474, filed May 26, 1989 and also assigned to the assignee of this application Since the manner of driving and supporting the camshaft 55 is not necessary to understand the construction and operation of this invention, the disclosures of those copending application are incorporated herein by reference and will not be described again in connection with this application. It should be noted, however, that the camshaft 55 is positioned generally above an arcuately configured upper wall of the cylinder head assembly 35.

The bearing assembly for the camshaft 55 includes a cam cover and bearing cap assembly, indicated generally by the reference numeral 56 and which pivotally supports rocker arm assemblies 57 and 58 in the manner described in the aforenoted copending applications, for example, by rocker arm shaft 60, for operating the intake valves 37 and 38 and exhaust valves 51, respectively. The number of rocker arms employed for this purpose can be varied and since the rocker arm and valve operating mechanism forms no part of the invention, these features are not believed to be necessary to understand the construction and operation of the embodiment of the invention.

As should be readily apparent, the use of a single camshaft 55 for operating all of the valves 37 and 38 and 51 simplifies the overall construction. However, the central positioning of the camshaft 55 makes it difficult, with conventional constructions, to position the spark plug for the engine at the center of the combustion chamber 37. In accordance with the invention, however, there is provided a spark plug well 59 consisting of aligned bores 61 and 62 formed in the cam cover 56 and cylinder head 35, respectively, to pass a spark plug 63. The cylinder head is formed with a tapped spark plug receiving opening 64 in which the spark plug 63 is received so that its gap is disposed substantially at the center of the combustion chamber 37 as may be best seen in FIG. 4. This permits good flame propagation and insures complete combustion under all running conditions.

It should be readily apparent from the foregoing description that the configuration of the cylinder head using multiple intake and exhaust valves all operated by a single overhead camshaft and the associated porting therefor provides a relatively complicated and complex cylinder head construction. In addition, this overall relationship results in an area which makes it very difficult to assure adequate and even cooling for the combustion chamber and the components associated therewith.

Figure 3:
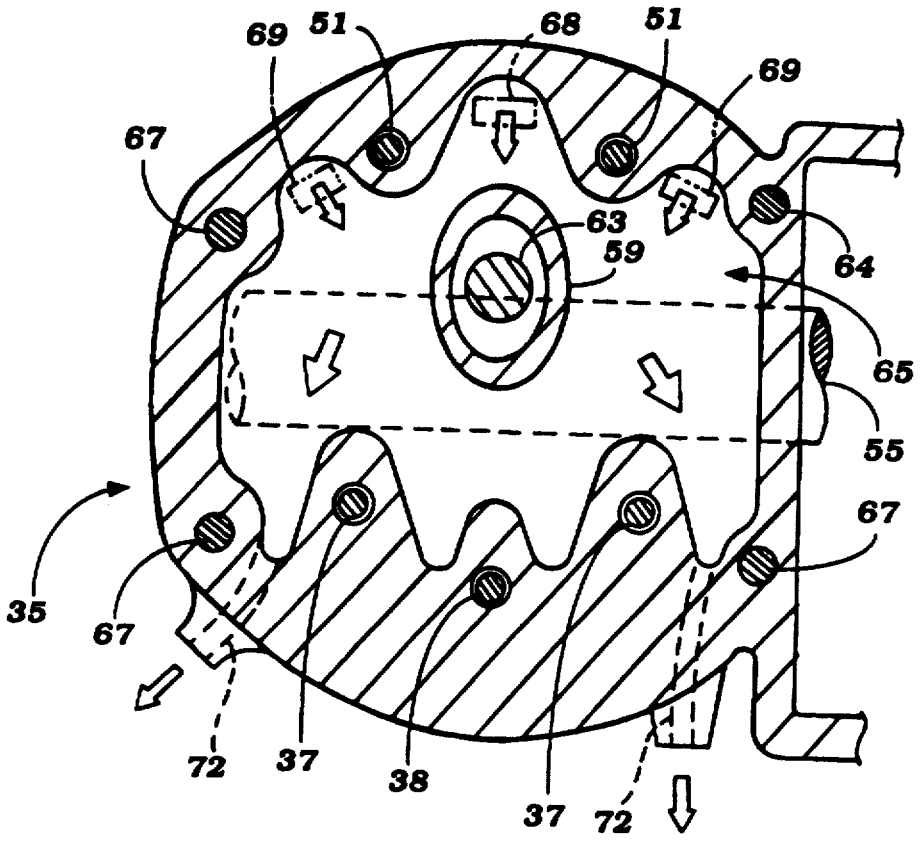
FIG. 3 is a cross-sectional view taken along the line 3—3 of FIG. 1 and shows a portion of the cylinder head cooling jacket.
Figure 4:
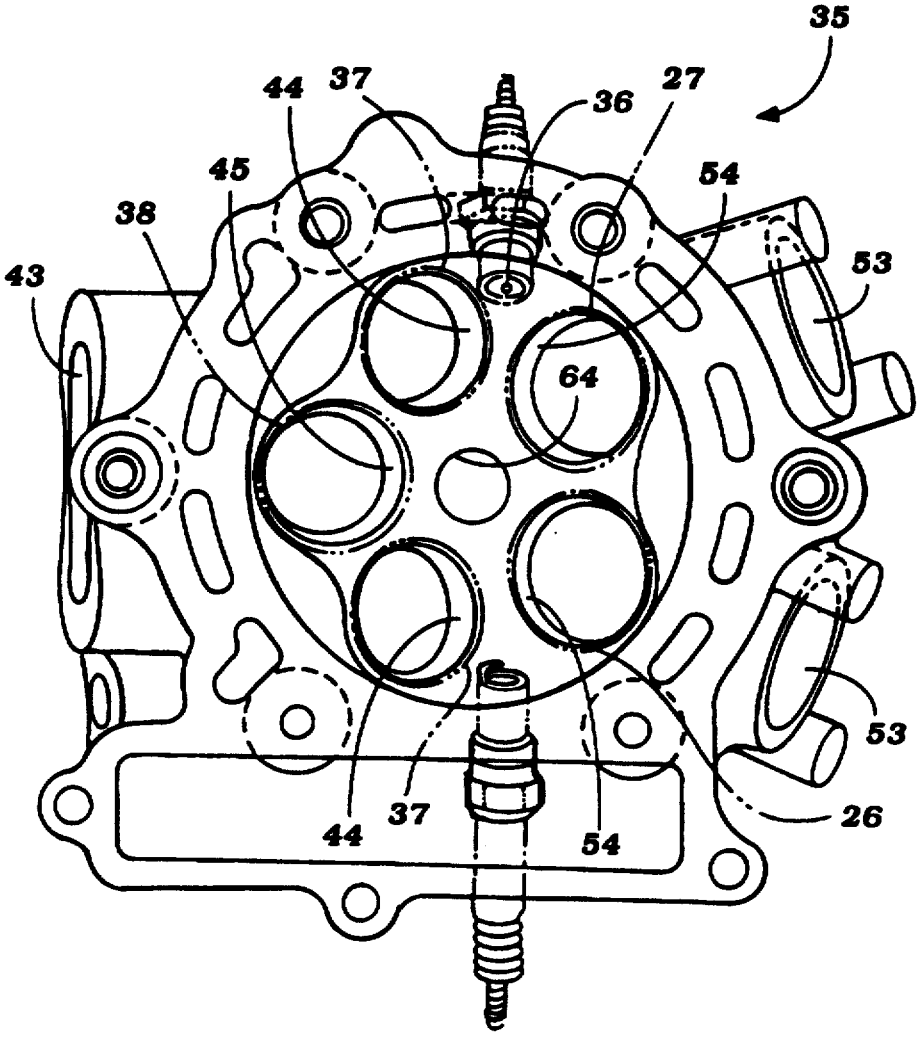
FIG. 4 is a bottom plan view of the cylinder head with the associated components removed as shown in phantom.
Figure 5:
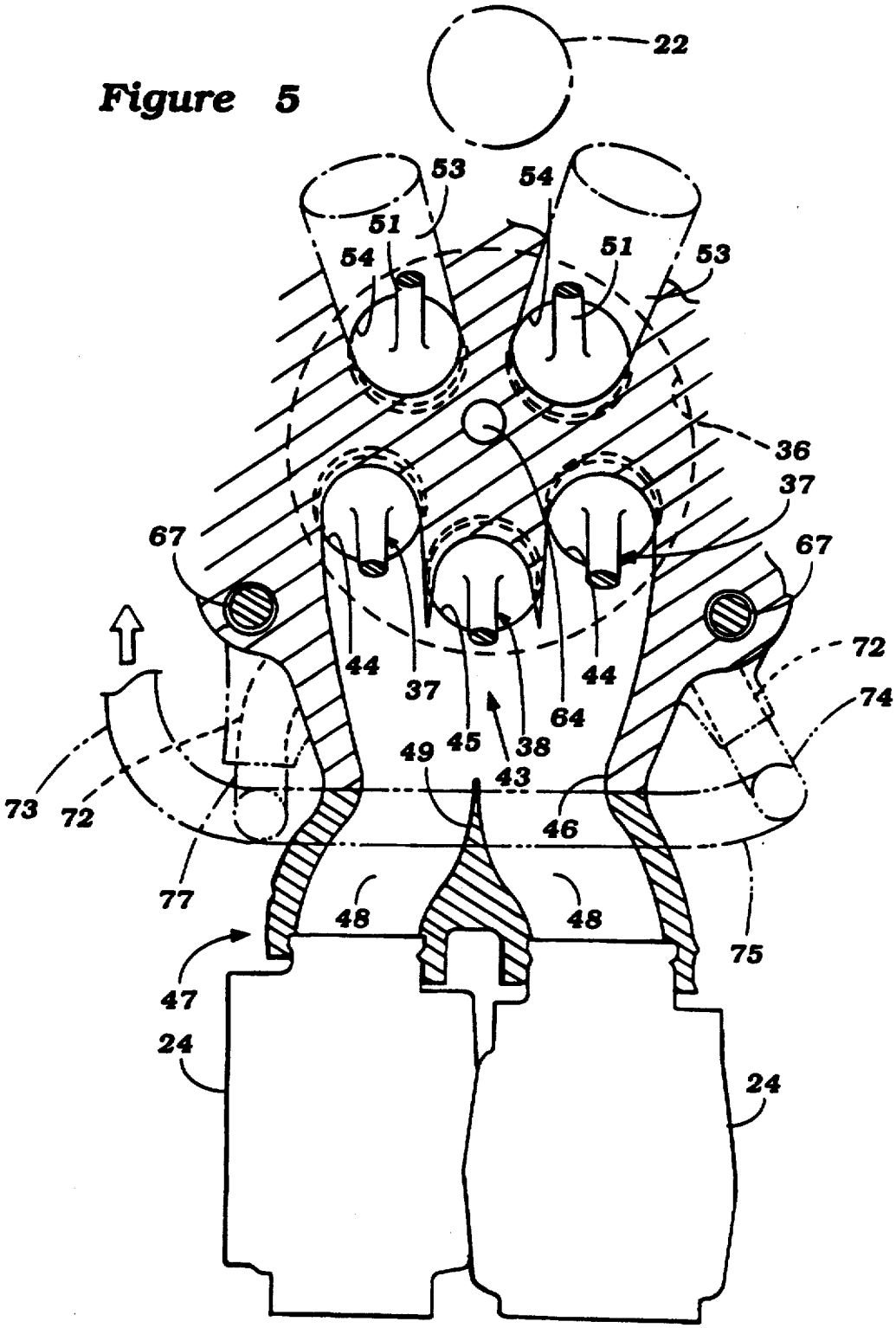
FIG. 5 is a cross-sectional view taken generally along the line 5—5 of FIG. 2.

However, in accordance with the invention, the cylinder head 35 is provided with a very large capacity cooling jacket 65 which is configured as best shown in FIG. 2 and 3, so as to substantially surround the spark plug well 59 and also to extend substantially in part around the portions of the cylinder head that reciprocally support the stems of the intake valve 37 and 38 and the exhaust valves 51 as clearly shown in FIG. 3. In fact, the cooling jacket 65 extends around greater than 180° of the bearing area of the respective valve stems so as to insure good and adequate cooling for them. Furthermore, the cooling jacket 65 extends between the cylinder head surface below the camshaft 55 and a lower surface 66 thereof which is adjacent the combustion chamber wall 37 so as to insure good cooling.

It will also be noted that the cylinder head 35 is affixed to the cylinder block 29 by means of a plurality of studs 67 and these studs are disposed at the corners of the combustion chamber 36 but outwardly of the area where the valves 37, 38 and 51 are supported so as to not interfere with the volume of the cooling jacket 65.

In addition to providing an adequate area cooling jacket, it is also essential to insure that the flow of coolant through the cooling jacket 65 will be in the appropriate direction and appropriate volumes so as to provide equal cooling across the entire combustion chamber so that there are no localized hot spots. To this end, coolant is delivered to the cooling jacket 65 in proximity to the portions of the cylinder head that support the exhaust valves 51 (the more highly heated valves) by means of a first inlet 68 that is disposed in the recess between the portion of the cylinder head that journals the exhaust valves 51 and a pair of outer inlets 69 that are each disposed between the cylinder head studs 67 and the cylinder head portion that journals the outer side of the exhaust valves 51. Water is delivered to these inlet 68 and 69 from a cooling jacket 71 of the cylinder block 29.

The coolant then flows in the direction of the arrows shown in FIG. 3 from the inlets 68 and 69 across the cooling jacket 65 toward a pair of spaced outlets 72 that are disposed outwardly of the portion of the cylinder head where the intake valve stems 37 are supported and the adjacent cylinder head studs 67. As a result, the hotter exhaust valves will be cooled first and then the cooler intake valves will be cooled.

Coolant is discharged from the cooling jacket 65 and specifically the outlets 72 to a water manifold 73 that extends across the rearward portion of the cylinder head 35 from a first exit port 74 that communicates with one of the passages 72 and a cross passage 75 which then is intersected by a passage 77 exiting from the other cylinder head outlet 72 for return to the radiator 30 for cooling. Of course, this circulation is effected by a suitable pressure pump (not shown) and thermostat.

It should be readily apparent, therefore, that the described arrangement is highly effective in insuring that the cylinder head will be adequate cooled and all components associated therewith will be cooled in the proper relationship so as to maintain substantially uniform temperatures across the cylinder head.

In the embodiment of the invention as thus far described, the engine has been provided with a single spark plug for the combustion chamber. In some instances, particularly where large bore engines are employed, it may be desirable to employ two spark plugs per cylinder so as to insure that the complete charge in the chamber will be burned, even under extreme high speed running conditions.

Figure 6:
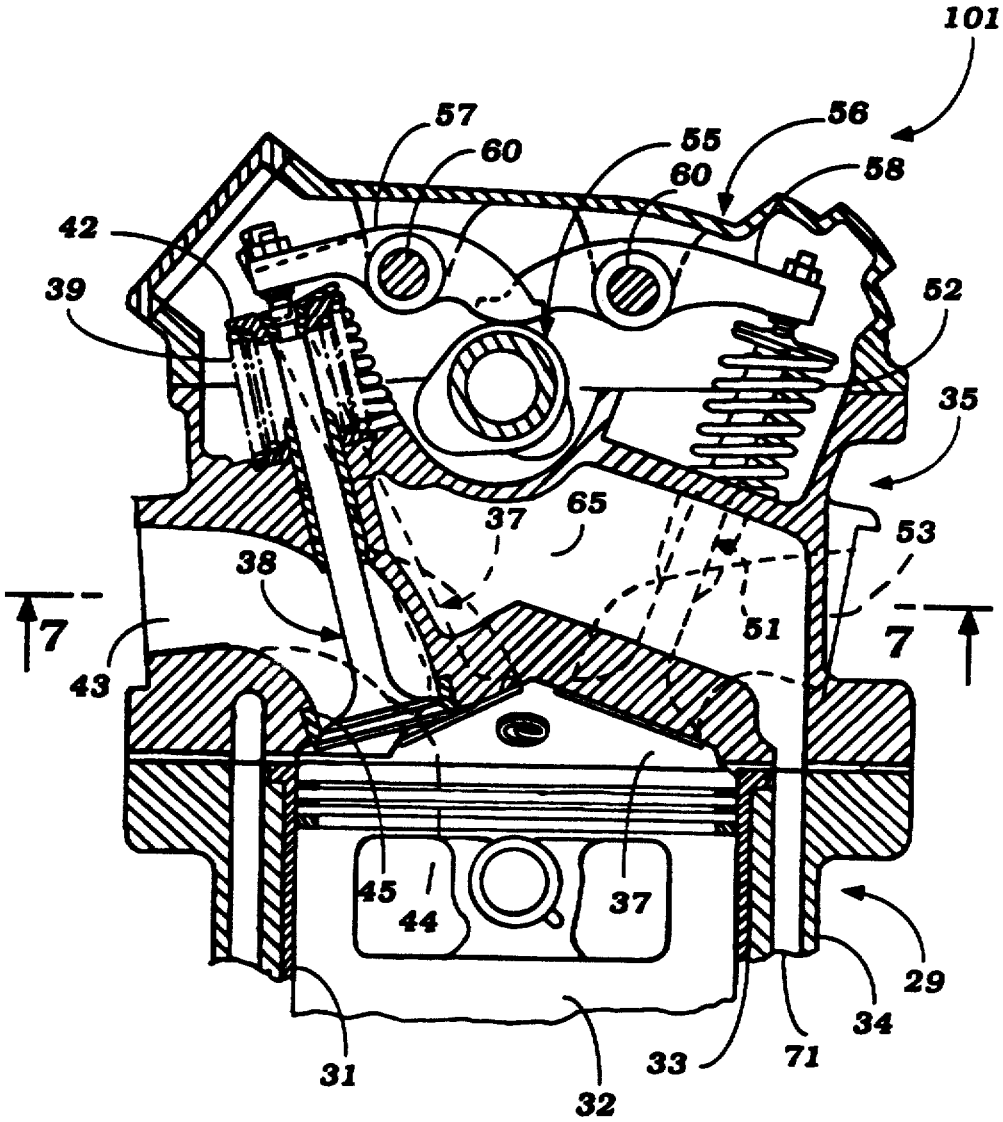
FIG. 6 is a cross-sectional view, in part similar to FIG. 2, showing another embodiment of the invention.
Figure 7:
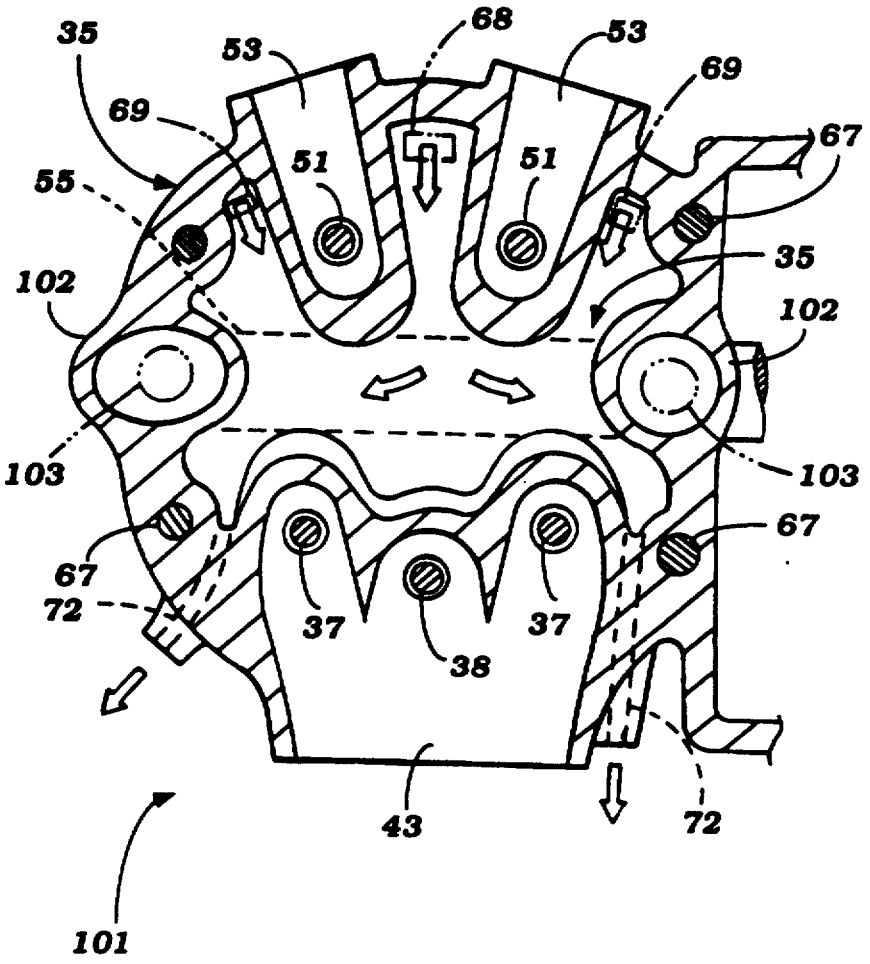
FIG. 7 is a cross-sectonal view taken along the line 7—7 of FIG. 6.
Figure 8:
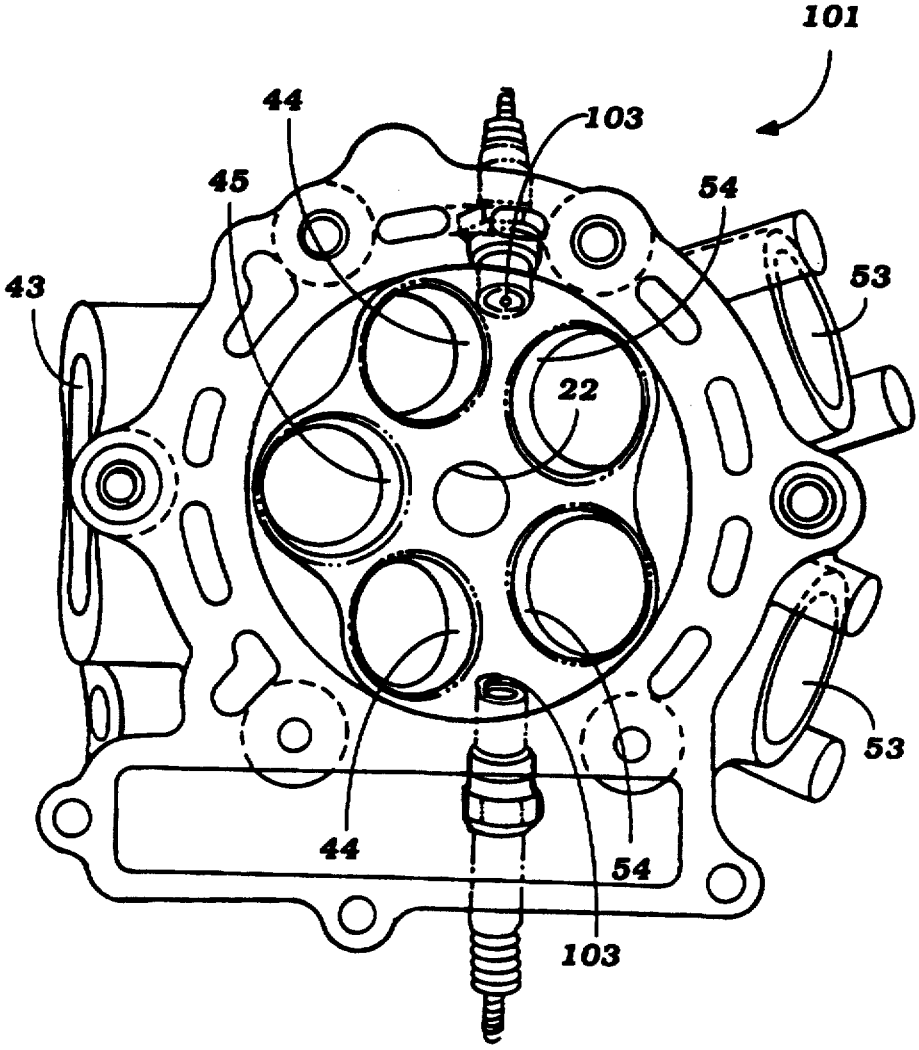
FIG. 8 is a bottom plan view of the cylinder head of this embodiment.

It has been previously noted that there is considerable difficulty in obtaining the desired spark plug positioning for even a single spark plug with a single camshaft multiple valve engine. However, in accordance with the invention, it is possible also to locate two spark plugs for each cylinder bore and combustion chamber while still affording access to the spark plugs and an adequate cooling jacket for the cylinder head. Such an engine is illustrated in FIGS. 6 through 8 and is identified generally by the reference numeral 101.

Except for the positioning of the spark plugs in this engine, the basic configuration of the combustion chamber, cooling jacket and coolant flow therethrough is the same as the previously described embodiment. For that reason, components of this embodiment which are the same as those of the previously described embodiment have been identified by the same reference numerals and will be described again only insofar as is necessary to understand the construction and operation of this embodiment.

In this embodiment, there are provided in the cylinder head assembly 35 and cam cover, bearing cap assembly 56 a pair of spark plug wells 102 that are formed on diametrically opposite sides of the cylinder head 102 and in a plane that extends generally parallel to the plane aforenoted containing the cylinder bore axis and, in fact, may be coincident with it. A pair of spark plugs 103 are received, one in each of these wells and have their gaps disposed in the combustion chamber as best shown in FIG. 8 wherein the spark plug gaps are disposed so that the flame travel from them will encompass the entire combustion chamber under all running conditions so as to insure complete combustion. It will be noted that the spark plug wells 102, as may be best seen in FIG. 7, are disposed out of the center of the cooling jacket 65 but nevertheless protrude substantially into it in the area of the inlets 69 and outlets 72 so as to insure adequate cooling in this area.

From the foregoing descriptions, it should be clear that two embodiments of the invention have been illustrated and described and each of which provides an adequate and copious cooling jacket for the cylinder head of a multiple valve internal combustion engine even when the construction incorporates only a single camshaft for operating the valves and wherein either one centrally positioned or multiple spark plugs are employed. Although two embodiments of the invention have been illustrated and described, various changes and modifications may be made without departing from the spirit and scope of the invention, as defined by the appended claims.

I claim:

1. A cylinder head for a liquid cooled internal combustion engine have a lower sealing surface surrounding a combustion chamber area defined in part by an associated cylinder, a plurality of intake valves having stem portions reciprocally supported within portions of said cylinder head about axes that lie at an acute angle to the associated cylinder and cooperating with intake passages formed in said cylinder head for sequentially delivering a charge to a pent roof combustion chamber formed at least in part by said cylinder head combustion chamber area, a plurality of exhaust valves having stem portions supported for reciprocation within portions of said cylinder head about axes that lie at an acute angle to the associated cylinder and cooperating with exhaust passages formed in aid cylinder head for sequentially discharging a burnt charge from the combustion chamber, a cooling jacket formed within said cylinder head contiguous to said combustion chamber area and extending at least partially around the portions of said cylinder head journaling at least some of said valve stems, said cylinder head portions being at least partially encircled by said cooling jacket in planes parallel to said cylinder head lower sealing surface to define pockets on the sides of some of said valve stems means for admitting liquid coolant to said cooling jacket in proximity to at least one of said cylinder head portions and adjacent at least one of said pockets for cooling the adjacent valve stem, and means for discharging liquid coolant from said cooling jacket in proximity to another of said cylinder head portions.

2. A cylinder head as set forth in claim 1 wherein the means for admitting liquid coolant to the cooling jacket is disposed in proximity to a portion of the cylinder head that supports an exhaust valve stem.

3. A cylinder head as set forth in claim 2 wherein the means for discharging liquid coolant from the cooling jacket is positioned in proximity to a portion of the cylinder head that journals an intake valve stem.

4. A cylinder head as set forth in claim 1 wherein there are plural inlets to the cooling jacket each in proximity to one of the cylinder head portions and adjacent a pocket formed thereby.

5. A cylinder head as set forth in claim 4 wherein all of the cooling jacket inlet portions are in proximity to portions of the cylinder head that support the exhaust valve stems and adjacent pockets thereof.

6. A cylinder head as set forth in claim 5 wherein there are plural outlets for discharging coolant from the cooling jacket.

7. A cylinder head as set forth in claim 6 wherein each of the outlets is positioned in proximity to a portion of the cylinder head that supports an intake valve stem.

8. A cylinder head as set forth in claim 1 further including a spark plug supporting pocket formed in the cylinder head, said spark plug supporting pocket being at least in part encircled by the cooling jacket.

9. A cylinder head as set forth in claim 8 wherein the spark plug pocket is formed centrally of the combustion chamber and is completely surrounded by the cooling jacket.

10. A cylinder head as set forth in claim 8 wherein there are a pair of spark plug pockets formed on opposite sides of the cooling jacket and at least partially encircled thereby.

11. A cylinder head as set forth in claim 1 further including a single camshaft journaled by said cylinder head and means for operating all of the valves from said single camshaft.

12. A cylinder head as set forth in claim 11 wherein the means for admitting liquid coolant to the cooling jacket is disposed in proximity to a portion of the cylinder head that supports and exhaust valve stem and adjacent a pocket formed thereby.

13. A cylinder head as set forth in claim 12 wherein the means for discharging liquid coolant from the cooling jacket is positioned in proximity to a portion of the cylinder head that journals an intake valve stem.

14. A cylinder head as set forth in claim 11 wherein there are plural inlet to the cooling jacket each in proximity to one of the cylinder head portions and adjacent pockets thereof.

15. A cylinder head as set forth in claim 14 wherein all of the cooling jacket inlet portions are in proximity to portions of the cylinder head that support the exhaust valve stems and adjacent pockets thereof.

16. A cylinder head as set forth in claim 15 wherein there are plural outlets for discharging coolant from the cooling jacket.

17. A cylinder head as set forth in claim 16 wherein each of the outlets is positioned in proximity to a portion of the cylinder head that supports an intake valve stem.

18. A cylinder head as set forth in claim 11 further including a spark plug supporting pocket formed in the cylinder head, said pocket being at least in part encircled by the cooling jacket.

19. A cylinder head as set forth in claim 18 wherein the spark plug supporting pocket is formed centrally of the combustion chamber and is completely surrounded by the cooling jacket.

20. A cylinder head as set forth in claim 18 wherein there are a pair of spark plug supporting pockets formed on opposite sides of the cooling jacket at least partially encircled thereby.

*21. A cylinder head for a liquid cooled internal combustion engine, said cylinder head being defined by a lower surface having a recessed portion forming at least in part a combustion chamber and a surrounding planer portion for sealing cooperation with an associated cylinder block, at least two first ports extending through one side of said cylinder head and terminating in a pair of spaced apart first valve seats on one side of said recess, at least two second ports extending through the other side of said cylinder head and terminating a pair of spaced apart second valve seats formed on the other side of said recess, and a cooling jacket formed internally of said cylinder head and extending substantially between said sides for receiving a liquid coolant, said cooling jacket being defined in part by internal spaced apart first and second walls defining said first ports so that said cooling jacket extends substantially from said one side of said cylinder head and between said two first ports, said cooling jacket being further defined by a third wall extending from the other side of said cylinder head and which defines both of said second ports and which extends back to the other side of said cylinder head so that said cooling jacket does not extend in any substantial extent between said second ports.*

*22. A cylinder head for a liquid cooled internal combustion engine as set forth in claim 21 further including a spark plug mounted within said cylinder head and extending between said two first ports.*

*23. A cylinder head for a liquid cooled internal combustion engine as set forth in claim 22 wherein the spark plug extends through the cooling jacket and is surrounded by a fourth generally cylindrical wall.*

*24. A cylinder head for a liquid cooled internal combustion engine as set forth in claim 23 wherein the cylindrical wall is inclined to the planer portion of the cylinder head.*

*25. A cylinder head for a liquid cooled internal combustion engine as set forth in claim 24 wherein the first ports comprised exhaust ports.*

*26. A cylinder head for a liquid cooled internal combustion engine as set forth in claim 25 wherein the spark plug is positioned with its spark plug gap substantially at the center of the combustion chamber.*

*27. A cylinder head for a liquid cooled internal combustion engine as set forth in claim 21 wherein there are at least three second ports extending from the other side of the cylinder head and each terminating at a respective valve seat on the other side of the recess.*

*28. A cylinder head for a liquid cooled internal combustion engine as set forth in claim 27 wherein the third wall defines at least in part all of the second ports.*

*29. A cylinder head for a liquid cooled internal combustion engine as set forth in claim 28 further including a spark plug mounted within said cylinder head and extending between said two first ports.*

*30. A cylinder head for a liquid cooled internal combustion engine as set forth in claim 29 wherein the spark plug extends through the cooling jacket and is surrounded by a fourth generally cylindrical wall.*

*31. A cylinder head for a liquid cooled internal combustion engine as set forth in claim 30 wherein the cylindrical wall is inclined to the planer portion of the cylinder head.*

*32. A cylinder head for a liquid cooled internal combustion engine as set forth in claim 23 wherein the first ports comprised exhaust ports.*

*33. A cylinder head for a liquid cooled internal combustion engine as set forth in claim 32 wherein the spark plug is positioned with its spark plug gap substantially at the center of the combustion chamber.*

*34. A cylinder head for a liquid cooled internal combustion engine as set forth in claim 27 wherein the first ports comprise exhaust ports and the second ports comprise intake ports.*

*35. A cylinder head for a liquid cooled internal combustion engine as set forth in claim 34 wherein the second ports all extend from a common opening in the other side of the cylinder head to the respective valve seats.*

* * * * *

UNITED STATES PATENT AND TRADEMARK OFFICE

CERTIFICATE OF CORRECTION

PATENT NO. : Re. 34,226

DATED : April 20, 1993

INVENTOR(S) : Isao Morishita

It is certified that error appears in the above-indentified patent and that said Letters Patent is hereby corrected as shown below:

Column 9, line 1, Claim 12, "and" should be --an--.

Column 9, line 8, Claim 14, "inlet" should be --inlets--.

Column 9, line 33, Claim 20, after "jacket" insert --and--.

Column 10, line 41, Claim 32, "23" should be --31--.

Signed and Sealed this

Twenty-second Day of February, 1994

*Attest:*

Bruce Lehman

BRUCE LEHMAN

*Attesting Officer*

*Commissioner of Patents and Trademarks*